April 2, 1946.    F. P. WILLCOX    2,397,573
MEANS FOR ADJUSTING CAMERA BED PLATES
Filed Feb. 27, 1945    2 Sheets-Sheet 1

INVENTOR
FREDERICK P. WILLCOX
By William D. Hall,
ATTORNEY

April 2, 1946.   F. P. WILLCOX   2,397,573
MEANS FOR ADJUSTING CAMERA BED PLATES
Filed Feb. 27, 1945   2 Sheets-Sheet 2
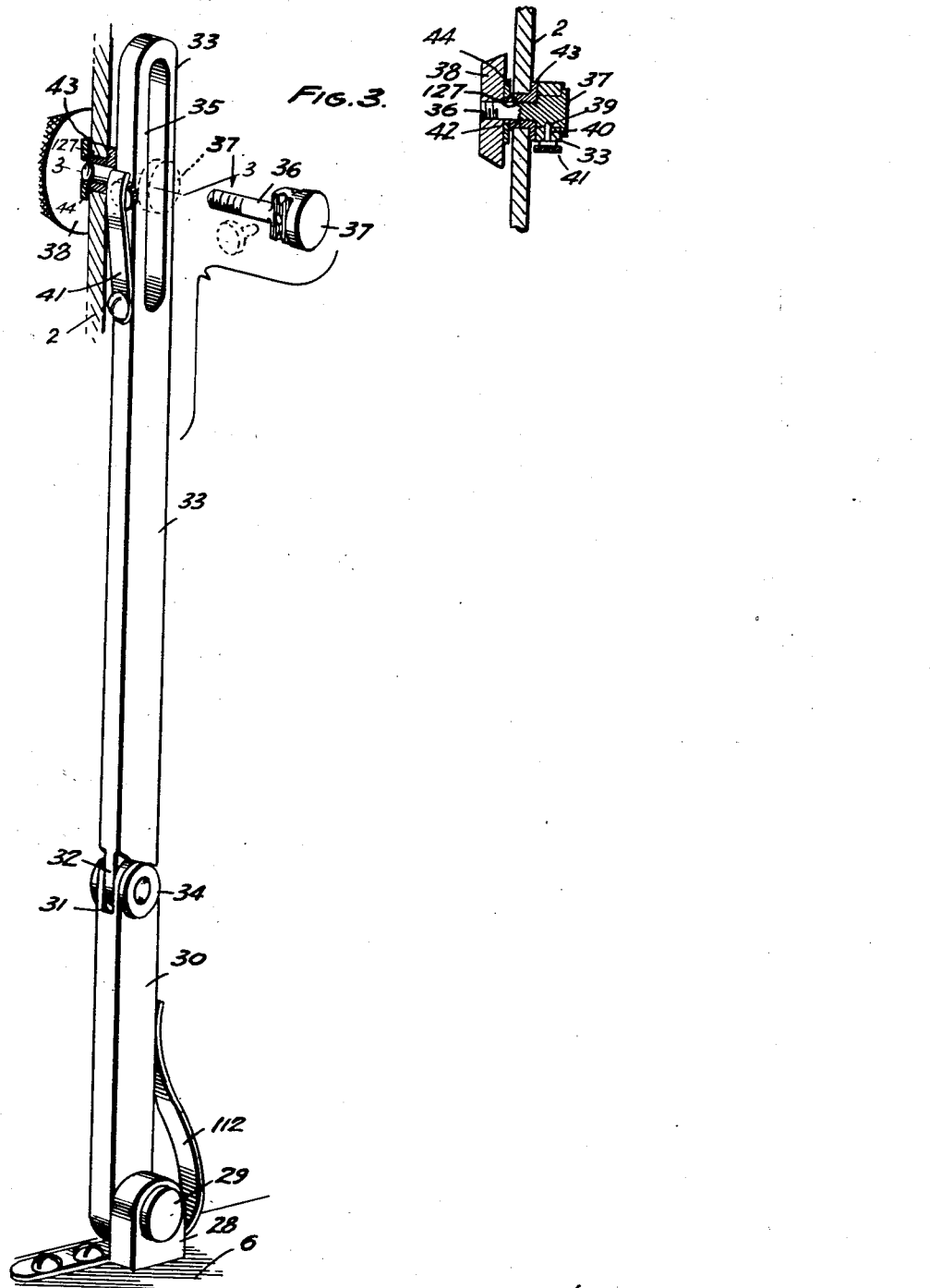
INVENTOR
FREDERICK P. WILLCOX
BY William D. Hall,
ATTORNEY

UNITED STATES PATENT OFFICE 2,397,573

MEANS FOR ADJUSTING CAMERA BED PLATES

Frederick P. Willcox, United States Army, Arlington County, Va.

Application February 27, 1945, Serial No. 580,058

2 Claims. (Cl. 95—40)

(Granted under the act of March 3, 1883, as amended April 30, 1928; 370 O. G. 757)

The invention described herein may be manufactured and used by or for the Government for governmental purposes, without the payment of any royalty thereon.

This application is a division of my application Serial Number 506,521, filed October 16, 1943.

This invention relates to cameras, and more particularly to improvements in means for adjusting camera bed plates.

In cameras of the high speed type such as used by newspaper photographers, etc., the adjustability of certain parts of the camera is of great importance. For example, the braces which hold the camera bed at right angles to the body have heretofore been of a conventional structure which enabled the positioning of the body and bed only at right angles. This was objectionable since it is often desirable to tilt or alter the alignment of the lens in various directions to bring different planes into focus, or to remove or introduce distortion.

It is, therefore, an object of this invention to provide in a camera adjustable bed braces which enable the angle between the bed and the body of the camera to be adjusted through an angle of more than 90°. This adjustability of the braces enables the bed to be dropped so that wide angle lenses can be used. Also with the bed in extreme lowered position, the lens can be lowered in relation to the focal plane to photograph in a downward direction without perspective distortion. It also enables the film plane to be set at an angle to the plane of the lens to accomplish the bringing of near and distant objects which lie in the same plane into focus at the same time. The construction is so arranged that this ability to adjust does not interfere with normal functions of the camera nor with opening and closing the camera, when such movements are not desired.

These and other objects are attained by the novel construction and arrangement of parts hereinafter described and illustrated by the accompanying drawings, forming a part hereof, and in which:

Figure 2 is a perspective view of a brace used for supporting the camera bed in various positions.

Figure 3 is a sectional view of a portion of the structure shown in Figure 2.

Figure 1:
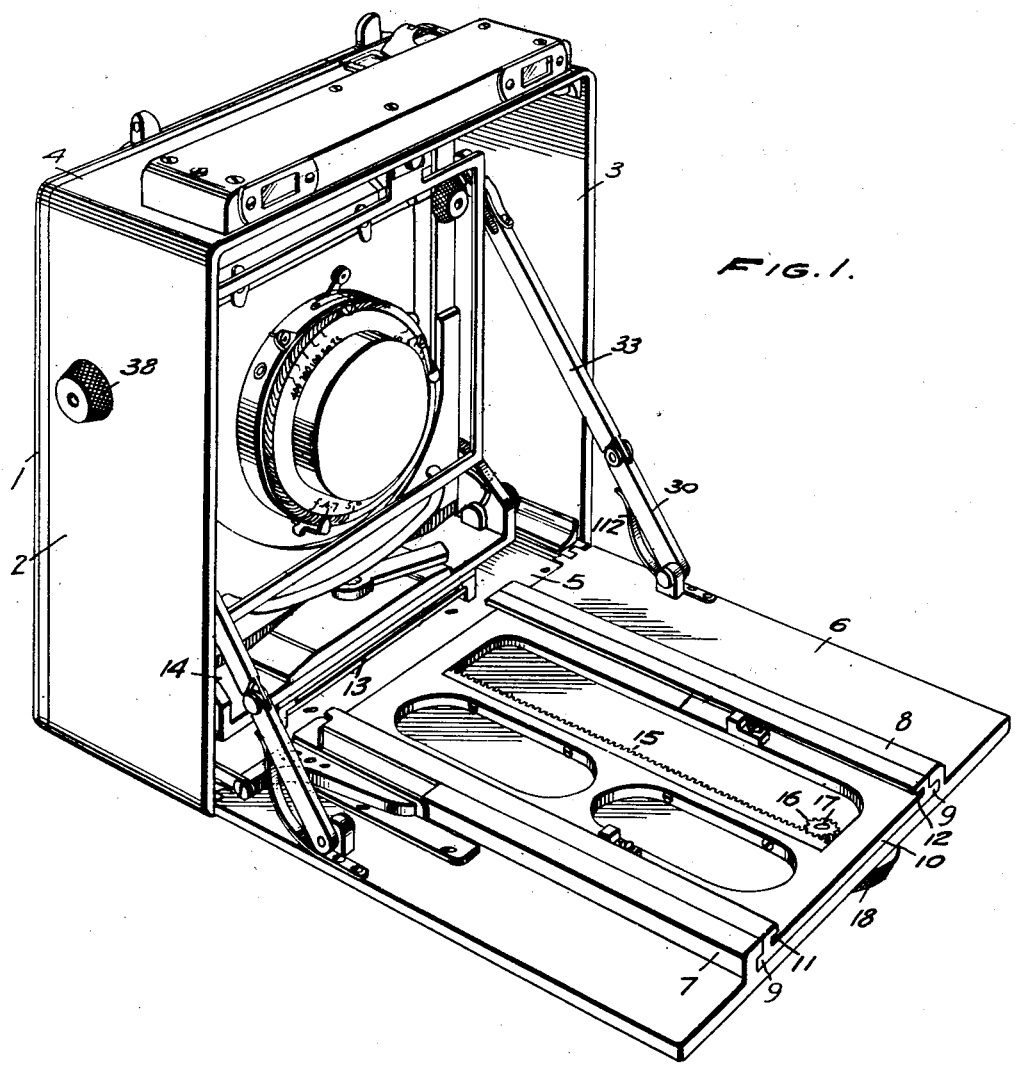
Figure 1 is a perspective view of a camera embodying the invention.

Referring to the drawings, in Figure 1, the camera is shown to comprise a casing 1, preferably made of a light weight metal, having side walls 2 and 3, and top and bottom walls 4 and 5, respectively.

Hinged to the bottom wall 5 is a bed 6 which also forms a front wall for the casing. Fixed to the bed 6 are a pair of spaced angle members 7 and 8 which together with the bed 6 form grooves receiving the flanges 9 on a plate 10, which has a pair of spaced guide grooves 11 and 12 adapted to receive and guide a plate 13 attached to the underside of the base 14 of the body of the camera.

Attached to the plate 10 is a rack 15 in mesh with a pinion 16 fixed to a pin 17 passing through the bed 6 and fixed to a knob 18. By rotating the knob, the plate 10 can be moved back and forth on the bed 6. The knob 18 is knurled and chamfered or beveled to present a frustoconical shape which enables it to be easily and positively grasped and be mounted with a minimum of clearance on a flat surface.

The large focusing knob 18 centrally located in a horizontal position near the front edge of the camera bed is easy to hold and enables finer adjustments of focus. Also, being thus located, part of the weight of the camera is supported on the heel or palm of the same hand which is used to manipulate the knob during the focusing operation, and enables the camera to be held steadily. Further, the construction described enables the general thickness and bulk of the camera to be reduced considerably.

The focusing rack 15 shown in the drawings, is single and centrally located on the inside edge of the sliding portion of the camera bed.

The bed 6 is supported by a pair of braces connected to the side wall of the casing. Since the structure of the braces is the same on each side, only one side will be described. (See Figs. 2, 3.) Fixed to bed 6 is a lug 28 supporting a pivot pin 29, which pivotally supports a link 30, provided with a groove 31, in which is positioned a tongue 32 projecting from link 33. The links 30 and 33 are pivotally connected by a pin 34. The link 33 has a longitudinal slot 35 in which is positioned a threaded pin 36 having a head 37. Positioned in an aperture in wall 2 is a bearing 42 having an integral flange 43 and a removable washer 44 fixed thereon and abutting a shoulder 127. The flange 43 and washer 44 are positioned on opposite sides of wall 2. The pin 36 passes through bearing 42 and receives a frusto-conical knurled nut 38. By rotating the nut 38 in the proper direction, the link 33 will be clamped tightly in a fixed position between the flange 43 and the head 37. The shoulder 127 spaces the washer 44 from wall 8 to allow the bearing to be freely rotatable in wall 8 when the link 33 is clamped between head 37 and flange 43.

When the bed 6 is opened to a position at right angles to the body of the camera, the links 30 and 33 assume a straight line position being urged constantly forward to said position by spring 112. Further movement beyond a straight line extending through links 30 and 33 is limited by design of groove 31 and tongue 32. The camera is closed by depressing the hinged joint between links 30 and 33 in a rearward direction with the thumbs or fingers thus permitting the bed 6 to be moved in closed position.

It is desirable that some indication be given when the links are in a position to hold the bed 6 at right angles to the body of the camera, that is, in the same plane as the bottom wall 5. Such indication is given by a clicking sound, which can also be felt, and which is produced by a small pin 40 snapping into a recess 39 in pin 37, the pin 40 being constantly under pressure from a flat spring 41 attached to the link 33, the pin passing through an aperture in the link 33.

The invention having been described, what is claimed is:

1. In a camera having a casing provided with a hinged front wall, a link pivotally connected to the front wall, a second link pivoted to the first link and having a slot near the free end thereof, a pivot pin having a first portion engaging said second link adjacent said slot, a second portion of non-circular profile received in said slot, and a third portion extending outwardly from said second portion, there being a notch in said second portion, a detent pin passing through an aperture in the second link and adapted to snap into said notch, spring means carried by the second link to urge the detent pin into the notch, a bushing rotatably mounted in the side wall of the casing adjacent said links, the third portion of said pivot pin passing through said bushing, said bushing having a flange at one end bearing against the inside of the side wall and a shoulder at its other end, a washer positioned on said shoulder on the outside of the side wall and a knob bearing against the washer and threadedly engaging the third portion of said pivot pin.

2. In a camera having a casing provided with a hinged front wall, a link pivotally connected to the front wall, a second link pivoted to the first link and having a slot near the free end thereof, a pivot pin having a head portion engaging said second link adjacent said slot and a flattened portion beneath said head portion and positioned in said slot, detent means associated with the flattened portion of said pivot pin and second link to hold the links in a definite position, a bushing rotatably mounted in the side wall of the casing, said pivot pin passing through the bushing, and a knob threadedly engaging the pivot pin on the outside of the side wall.

FREDERICK P. WILLCOX.